United States Patent [19]
Ohtsuki et al.

[11] Patent Number: 4,843,221
[45] Date of Patent: Jun. 27, 1989

[54] ELECTRONIC CARD RECEIVING DEVICE

[75] Inventors: Tomonari Ohtsuki; Yoshiaki Igarashi; Toru Uno, all of Mooka; Yoshiaki Tanaka, Satte, all of Japan

[73] Assignee: Daiichi Denshi Kogyo Kabushiki Kaisha, Tokyo, Japan

[21] Appl. No.: 76,488

[22] Filed: Jul. 22, 1987

[30] Foreign Application Priority Data

Jul. 26, 1986 [JP] Japan .................................. 61-176470
Sep. 5, 1986 [JP] Japan .......................... 61-136116[U]

[51] Int. Cl.$^4$ .............................................. G06K 7/06
[52] U.S. Cl. .................................... 235/441; 235/482; 235/486
[58] Field of Search ........................ 235/441, 482, 486

[56] References Cited

U.S. PATENT DOCUMENTS 4,724,310 2/1988 Shimamura et al. ............ 235/441 X

FOREIGN PATENT DOCUMENTS

62-35893 2/1987 Japan .

Primary Examiner—David L. Trafton
Attorney, Agent, or Firm—Silverman, Cass, Singer & Winburn, Ltd.

[57] ABSTRACT

An electronic card receiving device includes a card holder forming a card receiving space in the device for receiving an electronic card, a card latching mechanism for holding the electronic card in position in the card receiving space formed by the card holder, a contacting mechanism for electrically connecting the device to contacts of the electronic card held in position, and a card pushing mechanism for disconnecting the device from the electronic card and pushing it out of the device. The card pushing mechanism comprises a first ejecting plate and a second ejecting plate slidable in directions of inserting and removing the electronic card. The first ejecting plate comprises an abutting portion for applying a force to an inserted electronic card to push it in the direction of removing the card. The second ejecting plate comprises a stopper guide for obtaining an initial stable condition of the second ejecting plate, a latched condition of the inserted card and a transitional condition of the second ejecting plate during its sliding. When an electronic card is inserted into and removed from the device, an area where card terminals are rubbed by contact pins and time for such a rubbing are very small and short, so that the contact pins are scarcely worn and the card terminals of the electric card are not damaged to ensure high reliability of the system of this kind.

10 Claims, 11 Drawing Sheets

FIG.1 PRIOR ART

FIG_3

FIG_4

FIG_5

FIG_6a

FIG_6b

FIG_7a

FIG_7b

FIG_7c

FIG_8a

FIG_8c

FIG_8b

FIG_8d

FIG_9

FIG_10a

FIG_10b

FIG_10c

FIG_11a

FIG_11b

FIG_11c

FIG_11d

FIG_12

FIG_13a

FIG_13b

FIG_14

FIG_15

FIG_16a

FIG_16b

ELECTRONIC CARD RECEIVING DEVICE

BACKGROUND OF THE INVENTION

This invention relates to an electronic card receiving device for receiving a card in which integrated circuits are incorporated to have electronic functions, which is referred to as an "electronic card" hereinafter, and more particularly to a card inserting and removing mechanism for the electronic card receiving device.

As the integrated circuit technique has been developed in recent years, it has become to realize integrated circuits on a great scale in a small chip, so that various kinds of electronic cards having high degree functions have been developed so as to be used in wider applications.

Figures 1, 2A, 2C:
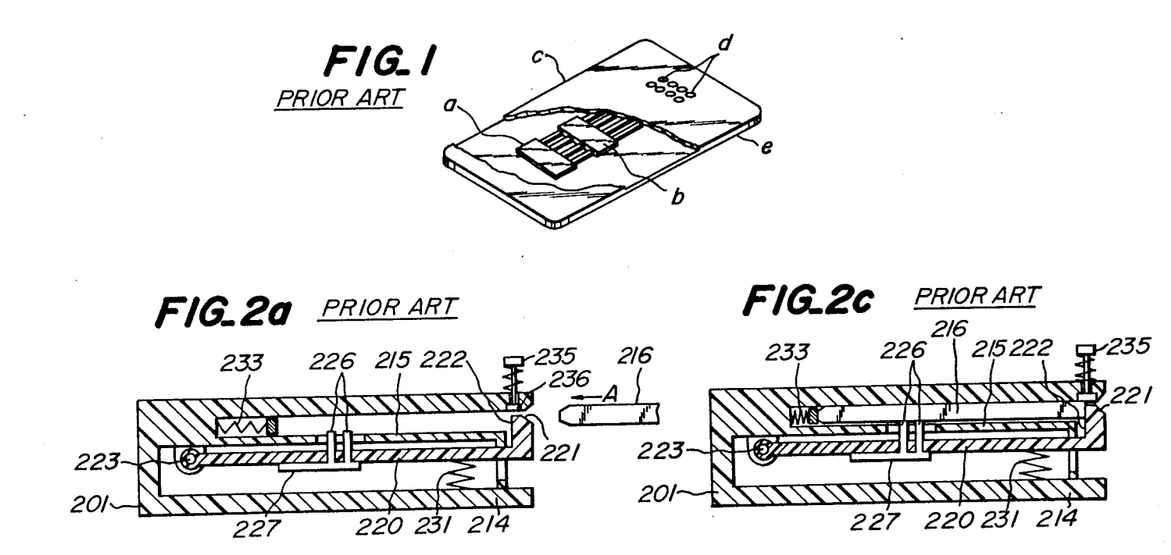
FIG. 1 is a perspective view illustrating of an electronic card.
FIGS. 2a, 2b, 2c, and 2d are sectional views illustrating a card receiving device of the prior art.

FIG. 1 illustrates one of such an electronic card which comprises a non-volatile memory a, i.e. ROM or RAM capable of electrical writing and reading, a central processing unit (CPU) b for controlling operations of the ROM or RAM, a substrate c in the form of a card in which the ROM or RAM and CPU are embedded, contacts d for connection with external electronic instruments. When such an electronic card is used, it is inserted into an electronic card receiving device attached to an external device of an electronic computer or its terminal equipment.

Figures 2B, 2D:
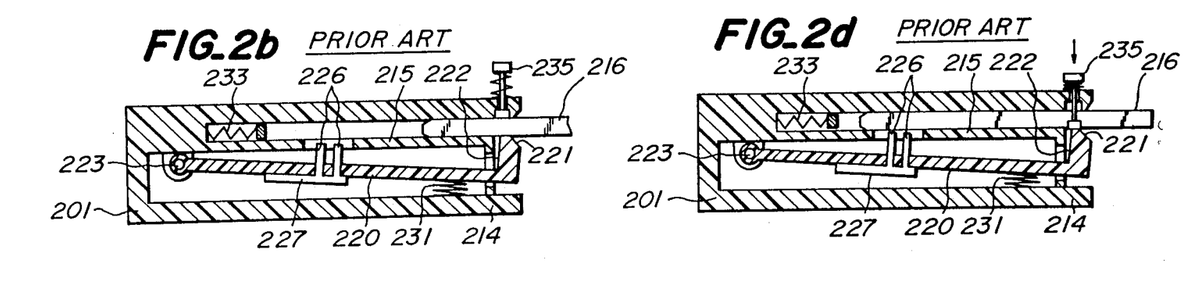

FIGS. 2a–2d schematically illustrate a construction of an electronic card receiving device which has been widely used, showing respective conditions, before insertion of a card (FIG. 2a), during insertion (FIG. 2b), just inserted and electrically connected (FIG. 2c), and during removal of the card (FIG. 2d).

The electronic card 216 is inserted into the receiving device in a direction shown by an arrow A as shown in FIG. 2a. The card 216 is advanced into the device, pushing downward a card guide 221 as shown in FIG. 2b. As a result, a card latch 220 moves downward together with the card guide 221, so that contacts 226 in the form of rods of a circuit board 227 attached to the card latch 220 move downward away from a surface of a card holder 215. FIG. 2c illustrates when the electronic card 216 has completely passed by the card guide 221 and has been received in a card receiving chamber. At this moment, the card latch 220 is raised by a spring force of a spring 231, so that the card guide 221 closes an inlet of the card receiving chamber, and the card 216 is fixed in position with respect to the card holder 215 by a reference surface 222 of the card guide 221 cooperating with the urging spring 231. Moreover, as the card latch 220 has been raised, the rod-like contacts 226 of the circuit board 227 attached to the card latch 220 extend beyond the surface of the card holder 215 so as to be connected to contacts of the electronic card to obtain a condition ready for communication.

When it is desired to remove the electronic card from the card receiving device, a reject key 235 extending out of a housing 201 of the device is pushed in a direction shown by an arrow in FIG. 2d. By depressing the reject key 235, the card guide 221 and the card latch 220 start to move downward as shown in the drawing, so that the contacts 226 of the circuit board 227 attached to the card latch 220 move also downward away from the contacts of the card 216 below the surface of the card holder 215. Further, when the card guide 221 is lowered at the level of the surface of the card holder 215, the electronic card 216 is pushed out of the device by a spring force of a leaf spring 233 provided in the card receiving chamber.

The hitherto widely used electronic card receiving device above described has such superior functions that when the electronic card is being inserted thereinto or removing therefrom, the contacts of the electronic card and the device do not rub each other and when the electronic card is once accommodated in the device, the card is securely fixed in position relative to the card holder 215 with the aid of the leaf spring 233 and the reference surface 222 of the card guide 221.

However, the device of the prior art as above described which solves various problems has still further problems as follows.

In the prior art of the card receiving device as above described, when an electronic card is removed from the device, the card latch 220 is pushed down by manually pressing the reject key 235 to move the electronic card 216 out of the device with the aid o the leaf spring 233.

With this arrangement, the electronic card 216 is pushed out of the device as soon as the reject key 235 is pressed. On the other hand, the reject key 235 is often pressed, for example, during writing or reading of the ROM and RAM in the electronic card or the reject key 235 is frequently unintentionally pressed, so that such a mishandling causes the ROM and RAM to be damaged or at least the contents of the ROM and RAM to be abnormal.

Moreover, the electronic card is pushed out of the device by means of the leaf spring 233. However, it is difficult to provide a long stroke distance of the leaf spring 233. If a distance by which the electronic card is moved out of the device is made sufficient, the leaf spring is subjected to an overload which would prematurely fatigue the leaf spring.

SUMMARY OF THE INVENTION

It is a principal object of the invention to provide an improved electronic card receiving device which eliminates all the disadvantages of the prior art above descried and which is able to prevent card terminals of a electronic card from being scraped by contact pins of the device so that the contact pins are scarcely worn and the card terminals are not damaged to ensure high reliability of the system of this kind.

In order to achieve this object in an electronic card receiving device including a card holder forming a card receiving space in the device for receiving an electronic card, a card latching mechanism for holding the electronic card in position in the card receiving space formed by the card holder, a contacting mechanism for electrically connecting the device to contacts of the electronic card held in position, and a card pushing mechanism for disconnecting the device from the electronic card and pushing it out of the device, according to the invention said card pushing mechanism comprises a first ejecting plate and a second ejecting plate slidable in directions of inserting and removing the electronic card, said first ejecting plate comprising an abutting portion for applying a force to an inserted electronic card to push it in the direction of removing the card, and said second ejecting plate comprising a stopper guide for obtaining an initial stable condition of the second ejecting plate, a latched condition of the inserted card and a transitional condition of the second ejecting plate during its sliding.

The electronic card receiving device according to the invention is summarized as follows.

(1) There are provided a first ejecting plate and a second ejecting plate in directions of inserting and removing an electronic card and the electronic card is pushed out of the device by means of a plurality of coil springs.

(2) There are provided a stopper and a stopper driving element in conjunction with the second ejecting plate so as to provide a limitation of latching operation of the card, for example, a prohibition of releasing the latched condition of the card according to inner conditions of the device.

(3) A card latch is provided with a latch retainer for providing a condition uncapable of latching and with a pressing lever for maintaining the latched condition.

The invention will be more fully understood by referring to the following detailed specification and claims taken in connection with the appended drawings.

BRIEF DESCRIPTION OF THE DRAWINGS

FIGS. 11a, 11b, 111c and 11d are enlarged sectional views and a perspective view illustrating principal parts of the embodiment of FIG. 10a;

DESCRIPTION OF THE PREFERRED EMBODIMENTS

FIGS. 3-9 illustrate a preferred embodiment of the invention. These drawings illustrate an electronic card 10 incorporating therein integrated circuits, a main body 11 of an electronic card receiving device according to the invention, a card insertion opening 12, an electronic card positioning spring 13 for urging an inserted card in one direction to position the card, card terminals 15 of the card 10, and a card detecting switch for detecting the electronic card inserted into a predetermined position in the device.

The electronic card receiving device of this embodiment further comprises a card latch 20 for latching the inserted electronic card 10, a latch portion 21 located at an end of the card latch 20 for restraining a rear end of the inserted electronic card 10, a reference surface 22 formed on a back side of the latch portion 21 and extending perpendicularly to the card latch 20, a card latch shaft for the card latch 20, a card latch shaft spring 24 for always raising the latch portion 21, and a contact terminal 25 mounted on the card latch 20 and having a number of contact pins 29 adapted to be in contact with the card terminals 15 when the electronic card 10 is latched by the latch portion 21. Such a contact terminal has been disclosed in Japanese Laid-open Utility Model Application No. 62-37,188 filed by the assignee of this case.

The electronic card receiving device further comprises a latch head 26 whose downward movement is prevented or allowed by inserting and removing its support member (refer to a reference numeral 71 in FIGS. 7a-7c later explained) to prevent or permit downward movement of the card latch 20 integral with the latch head 26, thereby preventing or releasing the latching the electronic card 10, and an ejecting head 27 for releasing the latch action of the latch portion 21 by raising upward the ejecting head 27 and hence the card latch 20 integral therewith. The card latch 20 is formed with a square aperture 28 which enables ends of the number of contact pins 29 to be in contact with the card terminals 15 of the inserted electronic card 10.

A first ejecting plate 40 is provided, which, upon inserting the electronic card 10, slides in an inserting direction of the card and ejects the card 10 by an instruction of latch releasing. A first coil spring 41 has one end secured to the first ejecting plate and the other fixed to a stationary portion of the device. The first coil spring 41 is elongated by the sliding movement of the first ejecting plate 40 in the inserting direction of the card 10 to accumulate an ejecting force for ejecting the card 10 according to the instruction of latch releasing. The first ejecting plate 40 is provided with an abutting portion 43. When the electronic card 10 is being inserted into the device, a front end of the card 10 abuts against the abutting portion 43 to cause the first ejecting plate 40 to slide in the inserting direction of the card 10. When the latching action of the card latch 20 is released, an ejecting force is applied to the card in a direction opposite to the inserting direction of the card by the abutting portion 43. The first ejecting plate is provided at its front end with a returning portion 44. An insertion of an electronic card 10 is detected by the card detecting switch 19 such as a photoelectric switch actuated by a switch actuating piece 45. The first ejecting plate 40 is formed with a driving element controlling arm 46 and elongated guide apertures 48 and 49 for guiding the first ejecting plate 40 being sliding.

There is provided a second ejecting plate 50 which is slidable in the inserting direction of the card 10 at an instructed moment to provide a condition capable of ejecting the electronic card 10. A second coil spring 51 connects the first ejecting plate 40 with the second ejecting plate 50 and is elongated by the sliding movement of the first ejecting plate 40 in the inserting direction so as to cause the second ejecting plate 50 in the inserting direction at the instructed moment. A stopper guide 52 is formed in the second ejecting plate 50, which serves to restrain the second ejecting plate 50 until an instruction is received. An ejecting bar 53 is provided on the second ejecting plate 50, which moves together with the sliding second ejecting plate 50 relatively to the eject head 27 to release the latching action so a to bring about the condition ejecting the electronic card 10. Elongated apertures 58 and 59 serve to guide the second ejecting plate 50 sliding.

A stopper (stopping means) 60 maintains the second ejecting plate 50 stopped at a predetermined position until the instruction is received. A stopper spring 61 acts upon the stopper 60 so as to maintain the second rejecting plate 50 stopped a the predetermined position. A stopper pin 62 is provided at one end of the stopper 60 and is guided in the stopper guide 52 of the second rejecting plate 50 for causing the second ejecting plate 50 to slide or stop the second ejecting plate 50 at the predetermined position. Reference numeral 63 denotes a stopper shaft constituting a shaft for the operation of the stopper 60. A stopper driving element 64 drives the stopper 60 and is rotatable about a stopper driving shaft 65. A spring 66 having a weak spring force causes the stopper driving element 64 to rotate in a direction shown by an arrow 101 or a clockwise direction viewed in FIG. 4. The stopper driving element 64 is also driven by a stopper driving pin 67 and is formed on an inner side with a driving pin guide aperture 68 for guiding the stopper driving pin 67 to transmit a force from the stopper driving pin 67 through the stopper driving element 64 to the stopper 60 only at a predetermined moment.

A latch retainer 70 prevents the latch head 26 from lowering to prohibit the latching action until an instruction is received. The latch retainer 70 has a latch retainer end 71 adapted to be in contact with a lower surface of the latch head 26 and is always urged by a spring 72 so as to rotate in a direction shown by an arrow 102 or in a counterclockwise direction viewed in FIG. 4. The latch retainer 70 is driven by a latch retainer driving pin 74.

There is provided a fixing plate 80 for fixing the various components. A solenoid 81 serves to drive the stopper 60 and the latch retainer 70 instantaneously against a force of the stopper spring 61. A fixing guide pin 83 is slidably fitted in guide apertures 49 and 59, fixing guide pins 84 and 85 are slidably fitted in guide apertures 48 and 58, respectively. The fixing plate 80 is formed with a latch head aperture 86 through which the latch head 26 and the eject head 27 extend. A slide plate 88 is connected to the solenoid 81 so as to be slidable and causes the stopper driving pin 67 and the latch retainer driving pin 74 to move simultaneously when instructed. A slide plate guide 89 serves to guide the slide plate 88.

Figure 5:
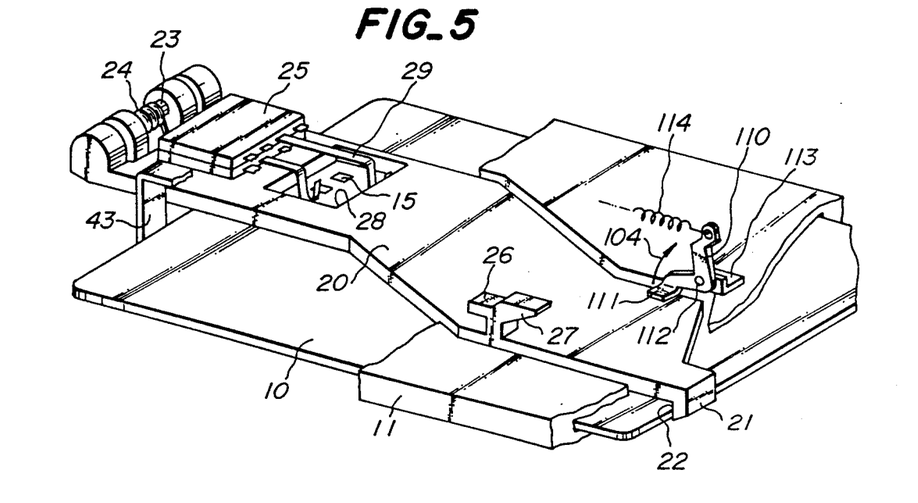

Referring to FIG. 5, a pressing lever 110 is pivotably connected to a pressing lever bearing 113 at a pressing lever shaft 112 and has a pressing lever coil spring 114 whose one end is connected to the pressing lever 110 and the other end is connected to the first ejecting plate 40. When the pressing lever 110 is pulled by the coil spring 114, a front end 111 of the pressing lever 110 is lowered to depress the card latch 20.

Figure 6A:
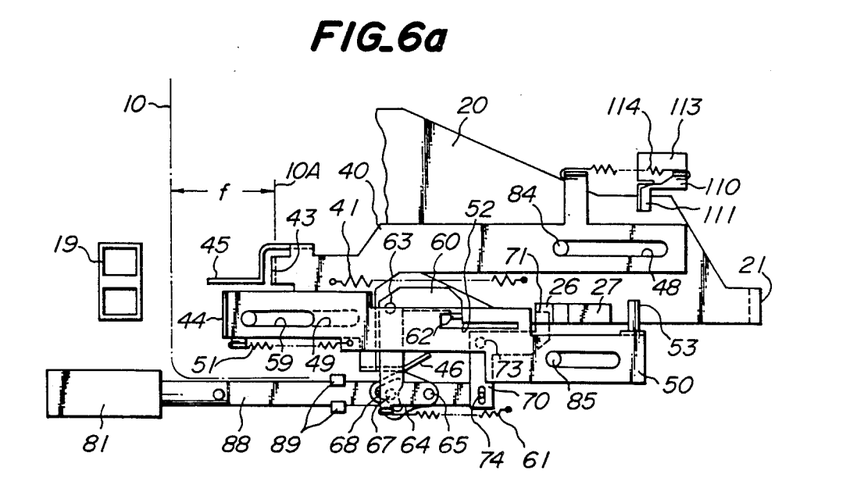
FIGS. 6a and 6b are plan views illustrating operating conditions of the principal parts of the device according to the invention.
Figure 7A:
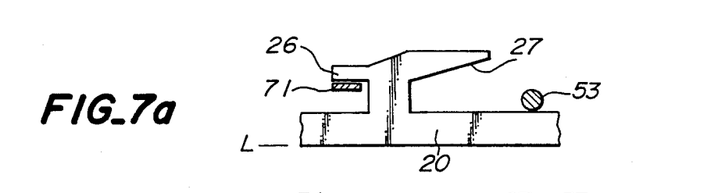
FIGS. 7a, 7b and 7c are enlarged sectional views for explaining operations of the principal parts of the device according to the invention.

FIG. 6a illustrates a condition of the device before the electronic card 10 is inserted. In the drawing of FIG. 6a, however, the driving element controlling arm 46 is shown in contact with the stopper driving element 64 in order to clarify the relation therebetween. The stopper pin 62 is at a stable position at a left end of the stopper guide 52. Under such a condition, the pressing lever coil spring 114 is not tensioned and does not pull the pressing lever 110, so that the front end 111 of the pressing lever 110 is raised by a force of the card latch shaft spring 24 and the latch portion 21 is maintained raised. Accordingly, when the electronic card 10 is inserted, there is no risk of the card 10 being scraped. Relations between the ejecting head 27 and the ejecting bar 53 and between the latch head 26 and the latch retainer end 71 are shown in FIG. 7a.

Relations between the stopper driving element 64 and the stopper driving pin 67 fixed to the slide plate 88 and between the stopper driving element 64 and the driving element controlling arm 46 are shown in FIGS. 8a–8d.

Figure 8A:
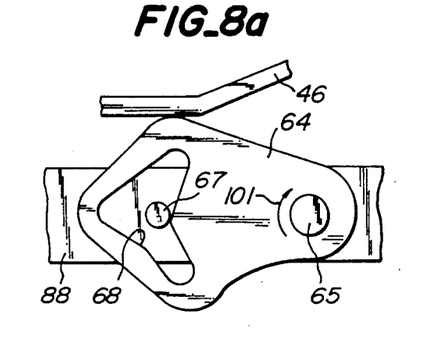
FIGS. 8a, 8b, 8c and 8d are enlarged plan views for explaining operations of the principal parts of the device according to the invention.
Figure 8B:
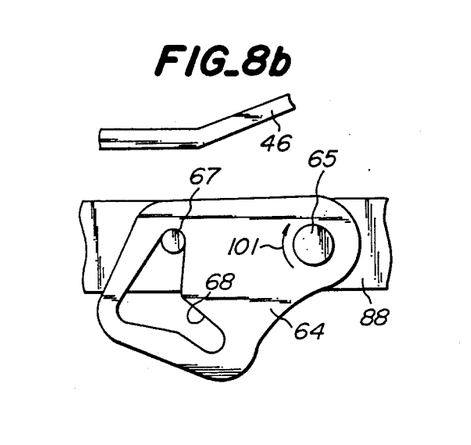

FIG. 8a illustrates a moment when the electronic card 10 has just been ejected. Under this condition, the driving element controlling arm 46 urges the stopper driving element 64 in a direction opposite to a direction shown by an arrow 101 in FIG. 8a against the weak spring force of the spring 66. The stopper driving pin 67 moves from a position shown in FIG. 8d in the driving pin guide aperture 68 and after the stopper driving pin 67 has moved beyond a projection of the element 64 extending into the aperture 68 as shown in FIG. 8a, the pin 67 falls into a position shown in FIG. 8b by the action of the stopper spring 61 so that the pin 67 is in a stable condition.

In the first stable condition shown in FIG. 6a, when an electronic card 10 is inserted into the card insertion opening 12, a front end 10A of the electronic card 10 pushes the abutting portion 43 to cause the first ejecting plate 40 to move inwardly through a distance f so that the front end 10A of the electronic card 10 arrives at a position shown in a dot-and-dash line 10.

At the moment, the switch actuating piece 45 actuates the card detecting switch 19 (FIG. 3) to detect the insertion of the card and simultaneously to actuate the solenoid 81 instantaneously. This instantaneous operation of the solenoid 81 is effected against the tensile force f the stopper spring 61, so that the stopper driving pin 67 and the latch retainer driving pin 74 are instantaneously moved to the left viewed in FIG. 6a. At this moment, the stopper driving element 64 is at the position shown in FIG. 8a. When the stopper driving pin 67 is instantaneously moved to the left the stopper driving element 64 is somewhat rotated in a clockwise direction by means of the spring 66 as shown in FIG. 8c. Therefore, the movement of the stopper driving pin 67 does not affect the stopper 60. The instantaneous movement of the latch retainer driving pin 74 causes the latch retainer 70 to rotate in the clockwise direction viewed in FIG. 4 against the force of the spring 72 so that the latch retainer end 71 moves from the position preventing the latch end 26 from lowering shown in FIG. 7a. As a result, the card latch 20 lowers by an action of the front end 111 of the pressing lever 110 pulled by the pressing lever coil spring 114 as shown in FIG. 5. Therefore, the rear end of the electronic card 10 is latched by the latch portion 21 to obtain the latched conditions shown in FIGS. 3, 7b and 8d, so that the electronic card 10 is under the completely latched condition.

Figure 3:
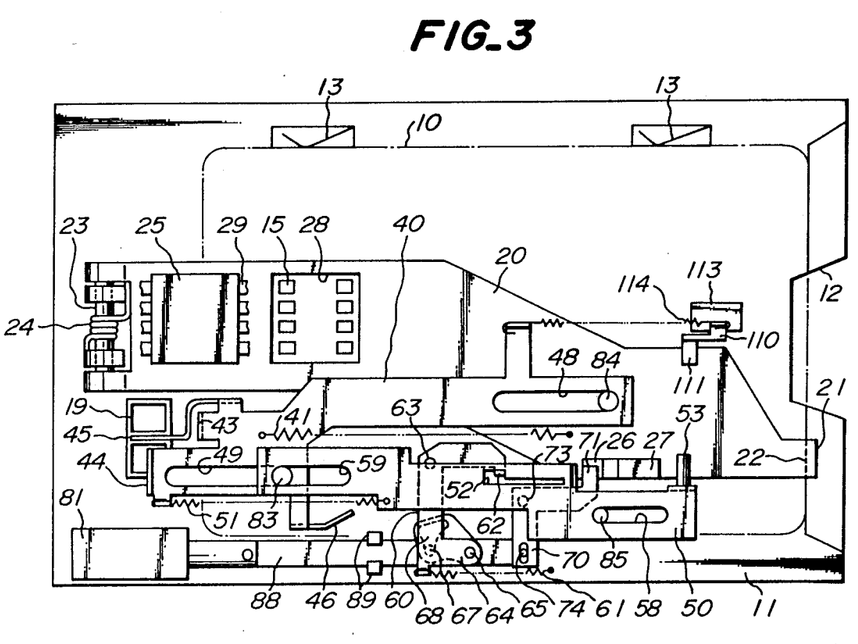
FIG. 3 is a plan view illustrating one embodiment of a card receiving device according to the invention.

In this case, the location of the card detecting switch 19 is not limited to that shown in FIG. 3, and it may be secured to any position so long as the switch 19 can detect the insertion of the card. Under the latched condition shown in FIG. 3, on termination of operation of electronic equipment, the solenoid is instantaneously operated to drive the stopper driving pin 67 in the position shown in FIG. 8d and the latch retainer driving pin 74, so that the stopper pin 62 tends to return immediately to its original position from the stable position provided by the stopper guide 52. However, the second ejecting plate 50 is moved in the inserting direction of the card 10 by the tension of the second coil spring 51. Therefore, the stopper pin 62 is not at the stable condition provided by the stopper guide 52 but at a transitional condition shown in FIG. 6a.

Figure 6B:
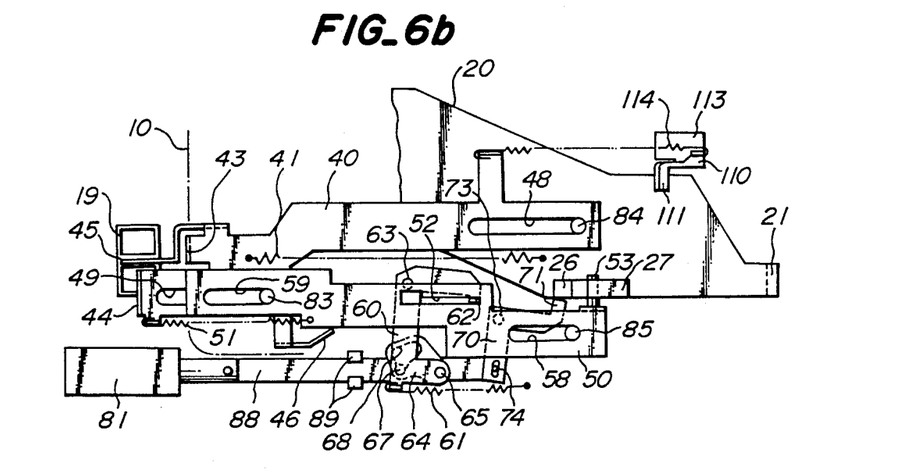

In the transitional condition shown in FIG. 6b, the second ejecting plate 50 has arrived at the left end by the tension of the second coil spring 51. Under such a condition, the ejecting bar 53 has arrived at the condition shown in FIG. 7c and the latch retainer end 71 has disengaged from the latch head 26 by being driven by the latch retainer driving pin 74 as shown in FIG. 7c, so that the ejecting head 27 and hence the latch portion 21 are raised to release the latched condition.

When the transitional condition shown in FIG. 6b is obtained, the rear end of the electronic card 10 is disengaged from the reference surface 22 of the latch portion 21, so that the abutting portion 43 of the first ejecting plate 40 pushes the front end of the electronic card 10 with the aid of the first coil spring 41 to eject the card out of the device.

At the same time of the ejection of the card, the returning portion 44 pushes the left end of the second ejecting plate 50 viewed in FIG. 6b and return the plate 50 into the stable condition shown in FIG. 6a.

During the process from the transitional condition shown in FIG. 6b to the stable condition shown in FIG. 6a, the stopper pin 62 is driven by the action of the stopper spring 61 into the stable condition provided by the stopper guide 52.

The electronic card 10 is driven through a distance t shown in FIG. 6a.

When the device is under the stable condition and electric power is cut off or a power source of the electronic equipment is turned off, even if an electronic card is erroneously inserted into the device the solenoid 81 would not be actuated and the latched condition would not be accomplished. Upon insertion of an electronic card 10, the front end 111 of the pressing lever 110 intends to lower the card latch 20 with the aid of the tension of the pressing lever coil spring 114. However, as the latch retainer end 71 present the latch head 26 from lowering as shown in FIG. 7a, the card latch 20 does not lower so that the electronic card 10 can be easily taken out of the device with the aid of the first coil spring 41 without being latched.

When the electronic card is under the latched condition shown in FIG. 3 and electric power is cut off or a power source of electronic equipment is turned off, a forced ejecting button 91 is pushed to apply a force through a forced ejecting bar 92 to the slide plate 88 in a direction shown by an arrow 103 to released the latched condition, so that the electronic card can be taken out of the device by returning the card with the aid of the first coil spring 41. A forced ejecting spring 93 serves to return the forced ejecting button 91 to the right viewed in FIG. 9. The forced ejecting bar 92 is guided by a forced ejecting bar guide 94 when the bar 92 moves.

Another embodiment of the invention is shown in FIGS. 10a-10c and 11a-11d, wherein the relation between the latch retainer 70 and the latch head 26 and their configurations are modified from those of the embodiment shown in FIGS. 3–9.

Figure 10A:
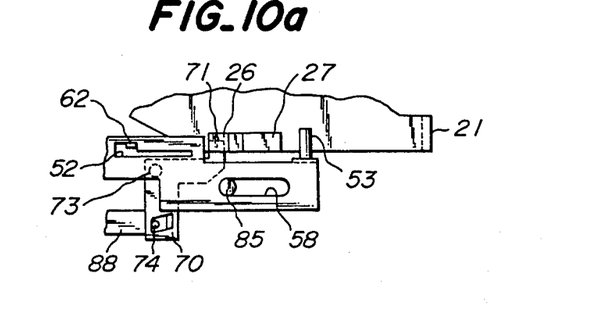
FIGS. 10a, 10b and 10c are partial plan views illustrating a further embodiment of the invention.
Figure 11A:
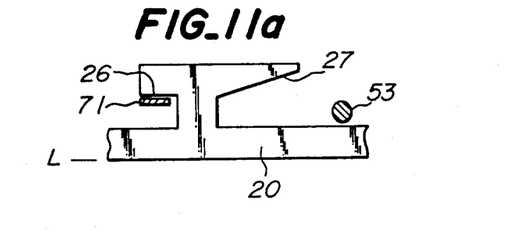

FIGS. 10a and 11a correspond to FIG. 6a and FIG. 7a, respectively and illustrate the condition after an electronic card has been ejected or before it is inserted. In this case, a latch retainer end 71 of the latch retainer 70 is located under the latch head 26 and prevent the latch head 26 from lowering.

Figure 4:
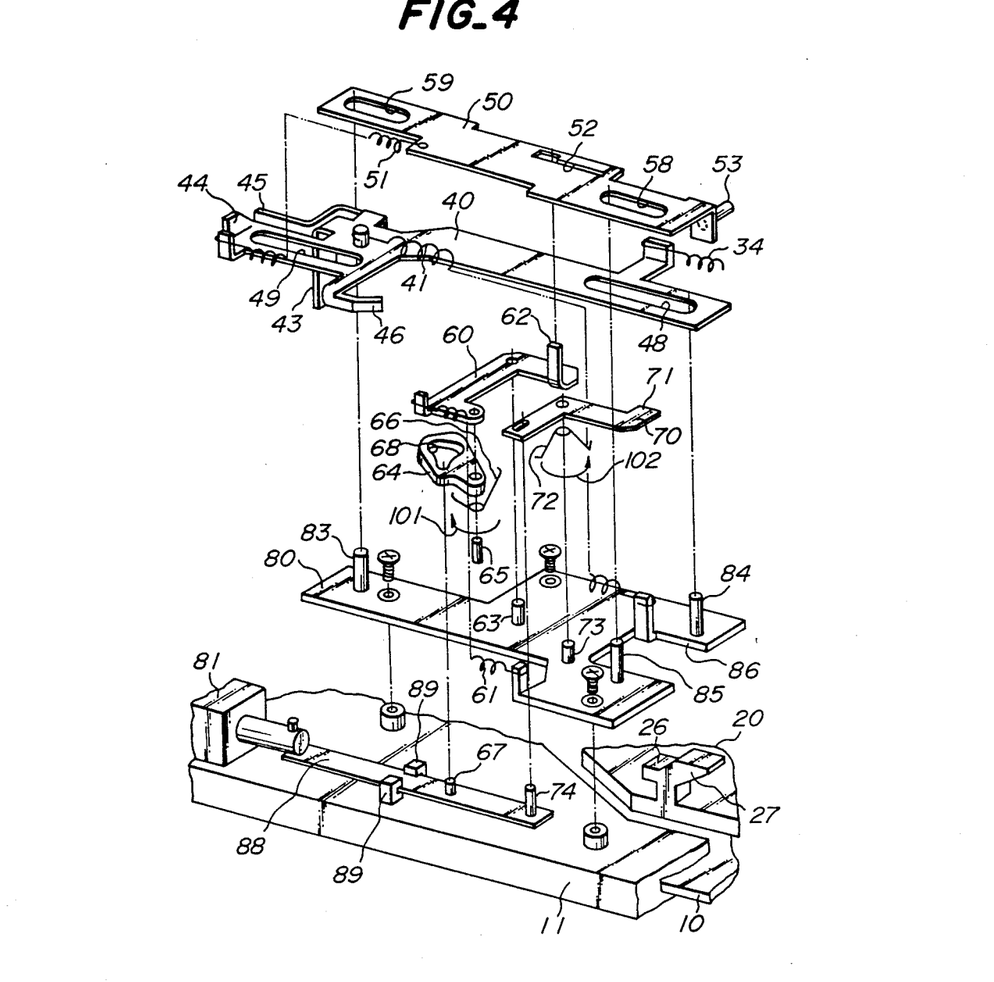
FIGS. 4 and 5 are exploded perspective views illustrating principal parts of the device according to the invention.
Figure 7B:
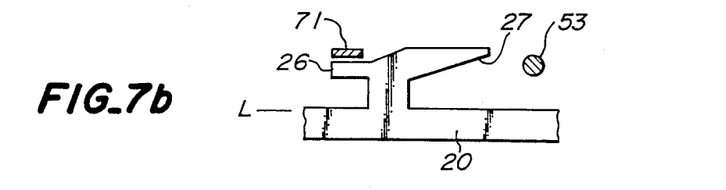
Figure 7C:
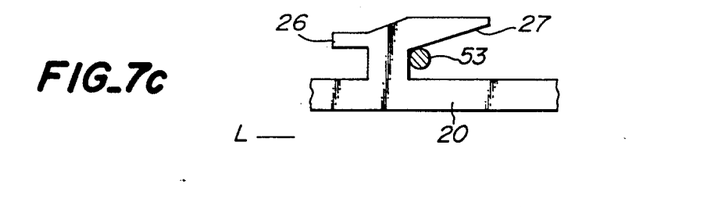
Figure 8C:
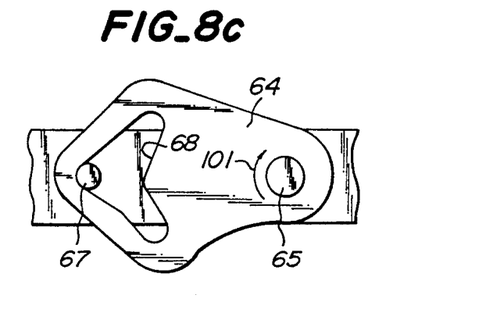
Figure 8D:
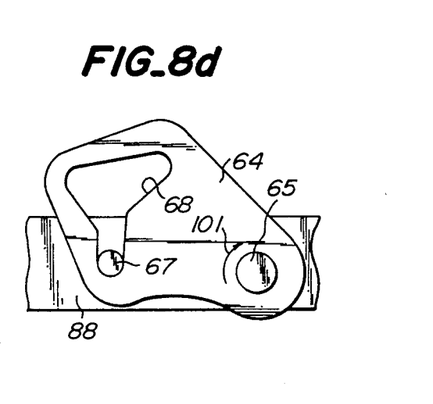
Figure 9:
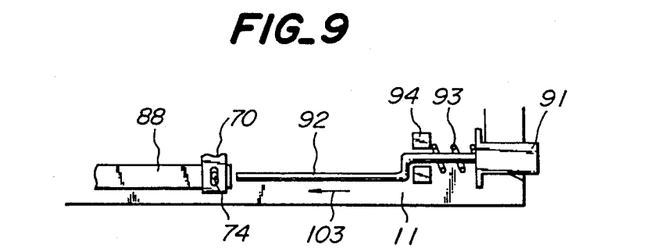
FIG. 9 is a plan view of another embodiment added with an additional function.
Figure 10B:
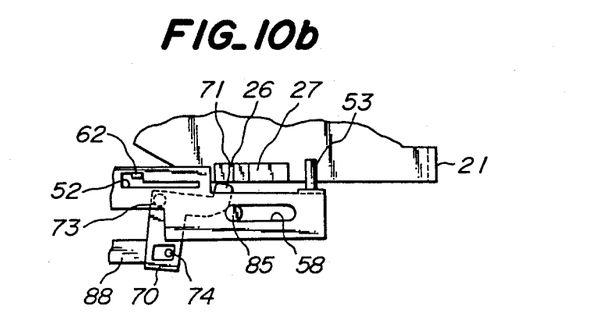
Figure 11B:
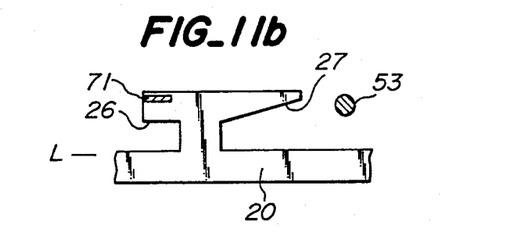

FIGS. 10b and 11b correspond to FIGS. 3 and 7b, respectively and illustrate a latched condition or an electronic card. FIG. 11d illustrates the latch head 26 in perspective view. The latch retainer end 71 is under a condition being slightly urged against a side surface to the latch head 26 by the action of the spring 72 (FIG. 4). At this time, the latch retainer driving pin 74 has returned to the right viewed in FIG. 10b by means of the stopper spring 61 (FIG. 3). However, the latch retainer 70 is not subjected to the force of the latch retainer driving pin 74 because of the large aperture of the latch retainer 70.

Figure 10C:
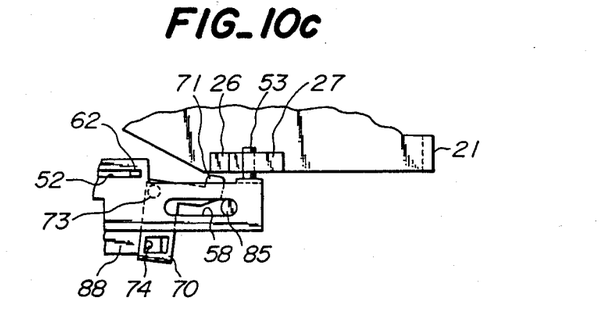
Figure 11C:
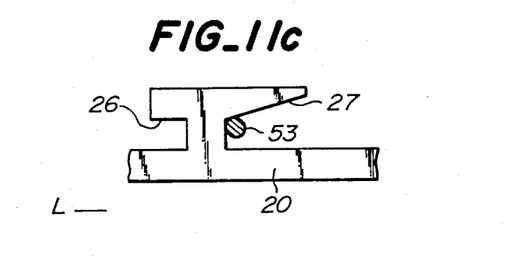
Figure 11D:
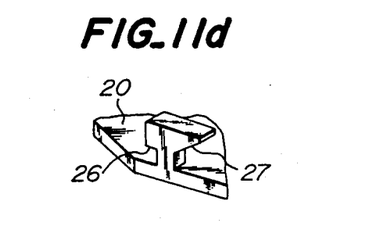

FIGS. 10c and 11c correspond to FIGS. 6b and 7c and illustrate the transitional condition for releasing the latched condition of an electronic card. In this case, the slide plate 88 is instantaneously attracted by the solenoid 81 (FIG. 6b) and the latch retainer driving pin 74 is moved to the left viewed in FIG. 10c to pull the latch retainer 70. Therefore, the latch retainer end 71 is slightly spaced from the side surface of the latch head 26. The operation of the ejecting bar 53 acting upon the ejecting head 27 to raise the latch portion 21 is substantially identical with that explained by referring to FIGS. 6b and 7c.

Figure 12:
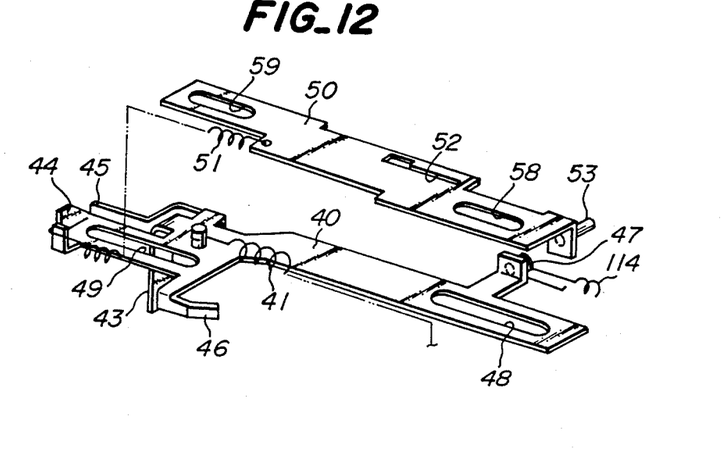
FIG. 12 is a partial perspective view illustrating a further embodiment of the invention.
Figure 13A:
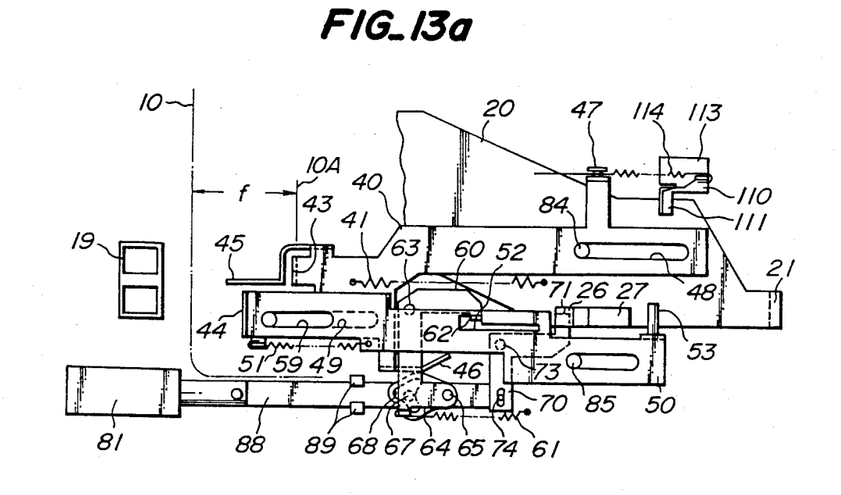
FIGS. 13a and 13b are plan views illustrating operating conditions of the embodiment shown in FIG. 12.
Figure 13B:
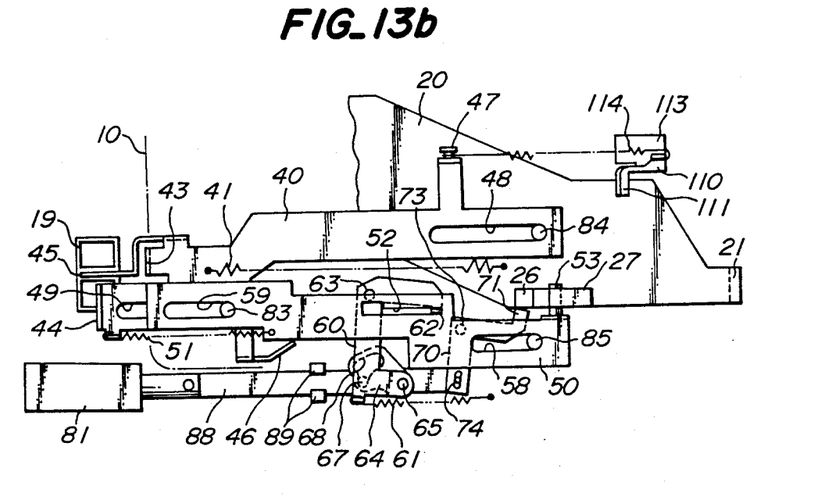

FIGS. 12–14a and 14b illustrate a further embodiment of the invention. FIG. 12 corresponds to FIG. 4 and FIGS. 13a and 13b correspond to FIGS. 6a and 6b, respectively. This embodiment is characterized in a relation between a pressing lever coil spring 114 and a coil spring terminal 47.

Figure 14:
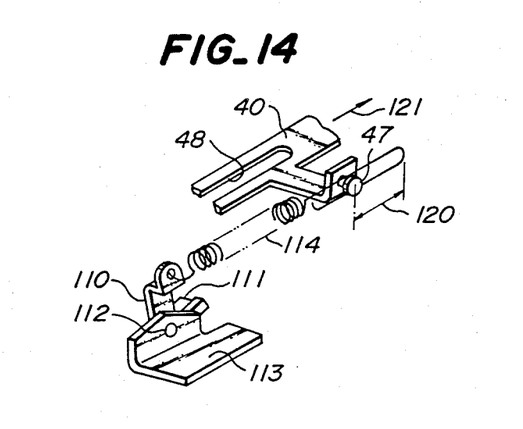
FIG. 14 is an enlarged perspective view illustrating main parts of the embodiment shown in FIG. 12.

The relation between the pressing lever coil spring 114 and the coil spring terminal 47 is shown in FIG. 14 which illustrates the condition before an electronic card 10 is inserted and corresponds to FIG. 6a. Under this condition, there is a "play" 120 between the coil spring terminal 47 and the pressing lever coil spring 114. Even if the electronic card 10 is inserted to cause the first ejecting plate 40 to move in a direction shown by an arrow 121 in FIG. 14, the pressing lever coil spring 114 is not subjected to a force unless a moving distance of the first ejecting plate 40 exceeds the "play".

Figure 16A:
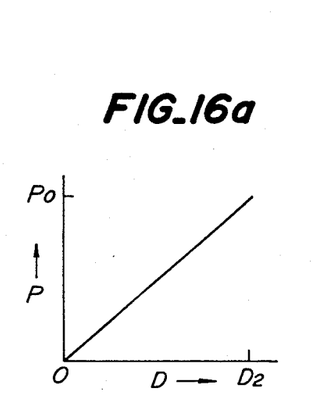
FIGS. 16a and 16b are graphs for explaining characteristics of the prior art device and the device according to the invention.
Figure 16B:
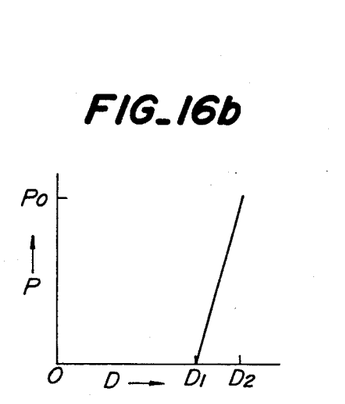

Assuming that the displacement of the coil spring terminal 47 is "D" and a force P acts upon the pressing lever coil spring 114 by the displacement of the terminal 47, the relation between the P and D is shown in FIGS. 16a and 16b. If there is no "play" 120, the force P becomes larger progressively as the displacement D of the terminal 47 becomes larger and when the displacement D is $D_2$, the force P is $P_0$. In case of FIG. 16b, a play 120 shown in FIG. 14 is $D_1$, and a pressing lever coil spring 114 having a larger spring constant than that of the case of FIG. 16a is used. Within the range of $0$-$D_1$ of the displacement, the force P is zero owing to the play, while the force P rapidly increases from the point where the displacement exceeds $D_1$ and the force P is $P_0$ at the displacement $D_2$ as shown in FIG. 16b. The condition of the displacement $D_2$ corresponds to the latched condition of the electronic card shown in FIG. 3.

In order to release the latched condition of the card, the above operation may proceeds in reverse direction from the displacement $D_2$ to zero in FIGS. 16a and 16b.

Figure 15:
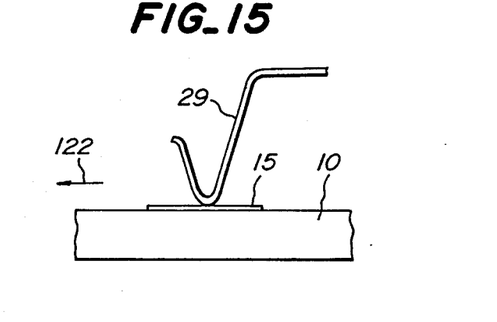
FIG. 15 is an enlarged side view for explaining an operation of parts of the embodiments in FIG. 12.

In FIG. 16a, when the latched condition is released, the force P of the pressing lever coil spring 114 becomes zero finally when the displacement D becomes zero. During such a displacement, therefore, a force is applied to the card latch 20 by the pressing lever 110 owing to the force P of the pressing lever coil spring 114. As shown in FIG. 15, therefore, when the electronic card 10 in a direction shown by an arrow 122, the card is subjected to a force from the contact pins 29, so that the card terminals 15 and the proximity thereof are scraped and damaged. Moreover, the contact pins may be considerably worn to reduce their reliability.

According to the invention, on the other hand, when the latched condition is released, the relation between the displacement D and the force P changes along the characteristic curve shown in FIG. 16b owing to the provision of the "play" 120. The time during which the contact pins 29 are in contact with the card terminals 15 of the electronic card is very short during the displacement from $D_2$ to $D_1$. Accordingly, a risk of the card being scraped, if any, is limited for a very short period of time, so that the damage of the card is seldom if ever. Moreover, the contact pins 29 are scarcely worn off so that the reliability is increased.

As can be seen from the above explanation, with the electronic card receiving device according to the invention, when an electronic card is inserted into and removed from the device, an area where card terminals are rubbed by contact pins and time for such a rubbing are very small and short, so that the contact pins are scarcely worn and the card terminals of the electric card are not damaged to ensure high reliability of the system of this kind. In the event of electric power failure or a power source being turned off, even if an electronic card is erroneously inserted into the device, the electronic card is not latched by the device, thereby easily removing the card out of the device.

Moreover, when the device according to the invention is operated, it is only required to flow a slight driving current instantaneously for the solenoid. Very small power consumption is sufficient to operate the device according to the invention. It is therefore advantageous to use the device in combination with a CMOSIC (complementary metal-oxide semiconductor integrated circuit). The device according to the invention is so constructed that high quality material and high accuracy are not needed for components constituting the device and excess stresses do not act upon the components. Therefore, the device according to the invention can be manufactured by less producing steps with low cost and with high reliability. The device according to the invention brings about great advantages in this manner to contribute to the development of industry.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An electronic card receiving device including a card holder forming a card receiving space in the device for receiving an electronic card, a card latching mechanism for holding the electronic card in position in the card receiving space formed by the card holder, a contacting mechanism for electrically connecting the device to contacts of the electronic card held in position, and a card pushing mechanism for disconnecting the device from the electronic card and pushing it out of the device, wherein said card pushing mechanism comprises a first ejecting plate and a second ejecting plate slidable in directions of inserting and removing the electronic card, said first ejecting plate including an abutting portion for applying a force to an inserted electronic card to push it in the direction of removing the card, and said second ejecting plate includes a stopper guide for obtaining an initial stable condition of the second ejecting plate, a latched condition of the inserted card and a transitional condition of the second ejecting plate during its sliding, said second ejecting plate further including a stopper portion, said stopper portion being guided by said stopper guide of said second ejecting plate and including a stopper driving member for transmitting a force to said stopper for releasing said latched condition and obtaining said transitional condition, said card latching mechanism including a card latch member including a latch portion having a surface extending substantially perpendicularly to the direction of inserting the electronic card for latching the inserted card, a latch head for selectively permitting the latch portion to latch the card and prohibiting the latching, and an ejecting head for releasing the card from the latched condition.

2. An electronic card receiving device as set forth in claim 2, wherein said card latch comprises a latch retainer acting upon said latch head to prohibit the latching.

3. An electronic card receiving device as set forth in claim 1, wherein said card latch comprises a pressing lever to which is connected one end of a coil spring, the other end of which is connected to the first ejecting plate for bringing said latch portion into a latching condition.

4. An electronic card receiving device as set forth in claim 3, wherein said coil spring is so connected to said pressing lever and said first ejecting plate that the coil spring is not subjected to a force immediately when the first ejecting plate is moved when the electronic card is inserted.

5. An electronic card receiving device as set forth in claim 1, wherein said card latch is pivotably movable through a slight angle about a bearing.

6. An electronic card receiving device as set forth in claim 3, wherein said pressing lever is pivotable about a pressing lever shaft at substantially mid portion of the pressing lever and has one end to which is connected one end of said coil spring and the other end of the pressing lever being in contact with said card latch.

7. An electronic card receiving device as set forth in claim 1, wherein said stopper guide comprises an inlet portion receiving said stopper for said stable condition and said latched condition, and a guide portion having a predetermined length extending from said inlet portion with a step portion in an opposite direction to the inserting direction of the card, said guide portion being relatively slidable to said stopper without substantial resistance.

8. An electronic card receiving device as set forth in claim 1, wherein said stopper is an L-shaped member and rotatable about an axis in the proximity of a bending portion of the L-shaped member, and one end of the L-shaped member being guided by said stopper guide and the other end being driven by driving means included in said card pushing mechanism to rotate through a predetermined angle.

9. An electronic card receiving device as set forth in claim 1, wherein said stopper driving element is rotatably connected to one end of the stopper and formed in the stopper driving element with a V-shaped driving pin guide aperture in which a stopper driving pin driven by driving means is movable in response to an operating condition, and said stopper driving pin does not apply any force to said stopper when said stable condition changes to the latched condition, and exerts a force to said stopper when said latched condition is released.

10. An electronic card receiving device comprising:
a card holder forming a card receiving space in the device for receiving an electronic card;
a card latching mechanism for holding the electronic card in position in the card receiving space formed by the card holder;
a contacting mechanism for electrically connecting the device to contacts of the electronic card held in position; and
a card pushing mechanism for disconnecting the device from the electronic card and pushing it out of the device, said card pushing mechanism including a first ejecting plate and a second ejecting plate slidable in directions of inserting and removing the electronic card, said first ejecting plate including an abutting portion for applying a force to an inserted electronic card to push it in the direction of removing the card, said second ejecting plate including a stopper guide for obtaining a first initial stable condition of the second ejecting plate, a second latched condition of the inserted card, and a third transitional condition of the second ejecting plate during its sliding so that said card latching mechanism and said contacting mechanism do not contact said card and said card contacts during insertion and removal of the card.

* * * * *

UNITED STATES PATENT AND TRADEMARK OFFICE
CERTIFICATE OF CORRECTION

PATENT NO. : 4,843,221

DATED : June 27, 1989

INVENTOR(S) : T. Ohtsuki, Y. Igarashi, T. Uno and Y. Tanaka

It is certified that error appears in the above-identified patent and that said Letters Patent is hereby corrected as shown below:

Column 2, line 35 "t" should be --f--;

Column 10, line 27 "claim 2" should be --claim 1--.

Signed and Sealed this

Tenth Day of July, 1990

*Attest:*

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,843,221

DATED : June 27, 1989

INVENTOR(S) : T. Ohtsuki, Y. Igarashi, T. Uno and Y. Tanaka

It is certified that error appears in the above-identified patent and that said Letters Patent is hereby corrected as shown below:

Column 7, line 35, "t" should be --f--;

Column 10, line 27, "claim 2" should be --claim 1--.

This certificate supersedes Certificate of Correction issued July 10, 1990.

Signed and Sealed this

Second Day of October, 1990

Attest:

HARRY F. MANBECK, JR.

Attesting Officer

Commissioner of Patents and Trademarks